United States Patent [19]

Leemkuil

[11] Patent Number: 4,542,815
[45] Date of Patent: Sep. 24, 1985

[54] AIR BRAKE AND RETARDER FOR GRAVITY CONVEYORS

[75] Inventor: Hendrik Leemkuil, Grand Rapids, Mich.

[73] Assignee: Lear Siegler, Inc., Grand Rapids, Mich.

[21] Appl. No.: 548,303

[22] Filed: Nov. 3, 1983

[51] Int. Cl.[4] .............................................. B65G 13/00
[52] U.S. Cl. ................................................. 193/35 A
[58] Field of Search ................. 193/35 A, 32, 40; 198/781

[56] References Cited

U.S. PATENT DOCUMENTS 3,108,671 10/1963 Fuka et al. ...................... 193/35 A Primary Examiner—Jeffrey V. Nase
Assistant Examiner—Mary Beth O. Jones
Attorney, Agent, or Firm—Price, Heneveld

[57] ABSTRACT

A brake mechanism for controlling the velocity of articles on a gravity conveyor has a pneumatically operated actuator. During each cycle of operation of the brake a charge of air of limited volume is supplied to the actuator. The actuator is equipped with an air bleed which limits the actuator's period of action during each cycle. The charge of air is supplied by an accumulator, which is normally connected to a source of compressed air. An article actuated sensor and connected valve, upon being tripped by an article, isolates the accumulator from its air supply and connects it to the actuator activating the actuator but limiting its air supply to the charge stored in the accumulator before the valve was shifted by the sensor. The charge, once exhausted, is not replenished until the sensor is released by the article.

11 Claims, 6 Drawing Figures

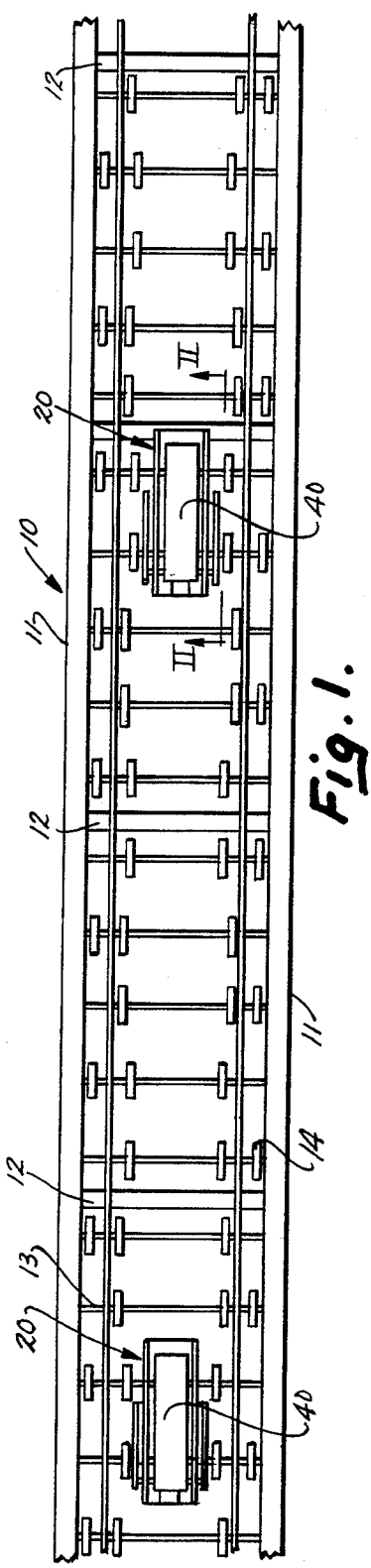
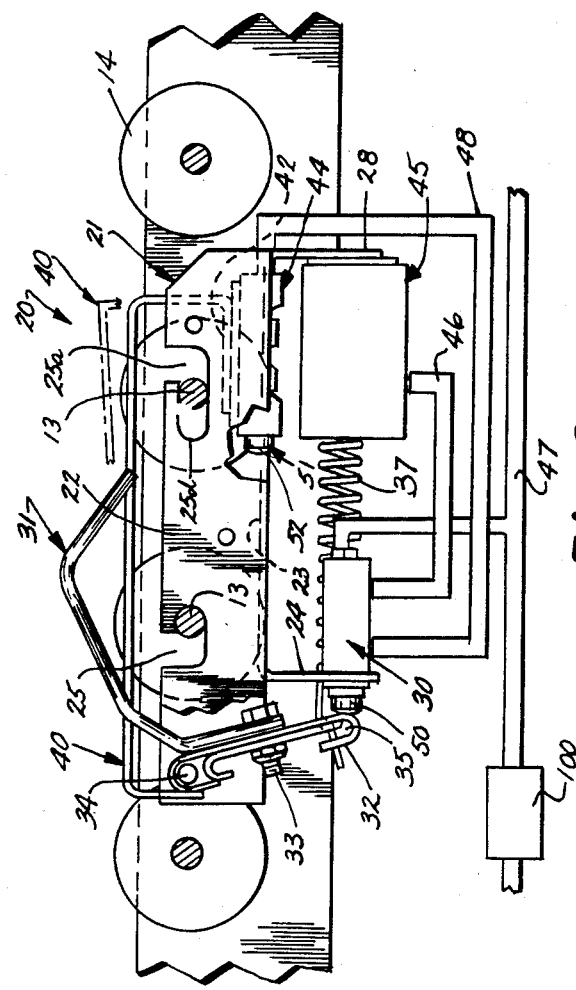
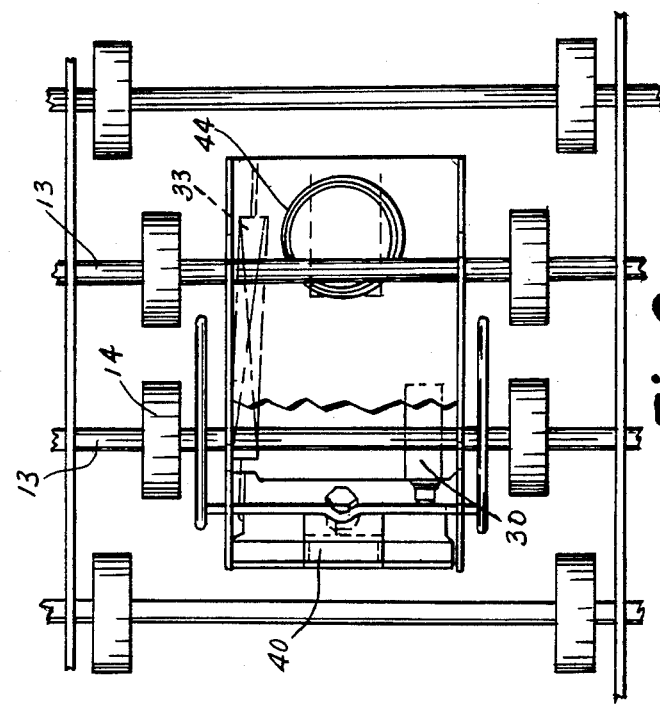
Fig. 1.
Fig. 2.
Fig. 3.

AIR BRAKE AND RETARDER FOR GRAVITY CONVEYORS

FIELD OF THE INVENTION

This invention relates to gravity conveyors along which articles are moved by gravity. The invention is particularly concerned with controlling the velocity with which the articles move under the accelerating effect of gravity.

BACKGROUND OF THE INVENTION

Various braking or retarding mechanisms have been developed for gravity conveyors over the years. These include brake pads designed to be of a length and type sufficient to substantially reduce the rate of travel of the article. Another approach has been that of rollers equipped with one or more of various types of dampening mechanisms including those of the braking type and those of the inertial type. All of these mechanisms heretofore have been characterized by one of several deficiencies. The brake pad type has the problem of a gradually decreasing efficiency as the pads wear whereby the braking affect becomes less and less over a period of time, requiring monitoring and replacement with increasing frequency. Another problem has been that of lack of adjustability of the system to accommodate articles of various sizes and weight and, therefore, of different acceleration characteristics. The centrifugal type of braking mechanisms do not work properly on light weight articles. Those which have been most effective have also been generally complex and, therefore, costly. Those that rely upon a wheel as the retarding mechanism have proven to be sensitive to the irregularities of the bottom surface of the articles being conveyed. Also such equipment does have the problem of the limited area of contact between the wheel and the article. This tends to reduce the effectiveness of the braking mechanism as well as to materially increase the incident of wear on both the articles and on the braking mechanism. Another problem has been that if the retarding mechanism actually stopped the article there was no means of reinitiating its forward movement without the intervention such as by the article being hit by the next approaching article. This, in many cases is undesirable.

BRIEF DESCRIPTION OF THE INVENTION

The invention provides a compact, self-contained braking unit equipped with an accumulator. The accumulator is automatically charged whenever the mechanism is inoperative. When the mechanism is triggered by the approach of an article, the accumulator is automatically connected to the braking actuator which shifts a braking plate or shoe into active position to apply a braking force to the article and thereby slow it down. The actuator for the brake or shoe is equipped with a bleed, the size and volume of which is gauged to apply the brake for a predetermined length of time such that the brake will not completely halt forward motion of the article but will reduce its velocity to that which is necessary for the proper operation of the mechanism. Even if all forward movement of the article is halted, the automatic retraction of the brake will release the article to resume forward movement. The braking force applied to the article can be adjusted to that needed to control effectively the velocity of the article's motion.

BRIEF DESCRIPTION OF THE DRAWINGS

FIG. 1 is a fragmentary plan view of a length of gravity conveyor equipped with this invention;

FIG. 2 is an enlarged sectional view taken along the plane II—II of FIG. 1;

FIG. 3 is an enlarged plan view of the braking mechanism illustrated in FIG. 2 with the brake plate omitted for clarity;

DESCRIPTION OF THE PREFERRED EMBODIMENT

Figure 4:
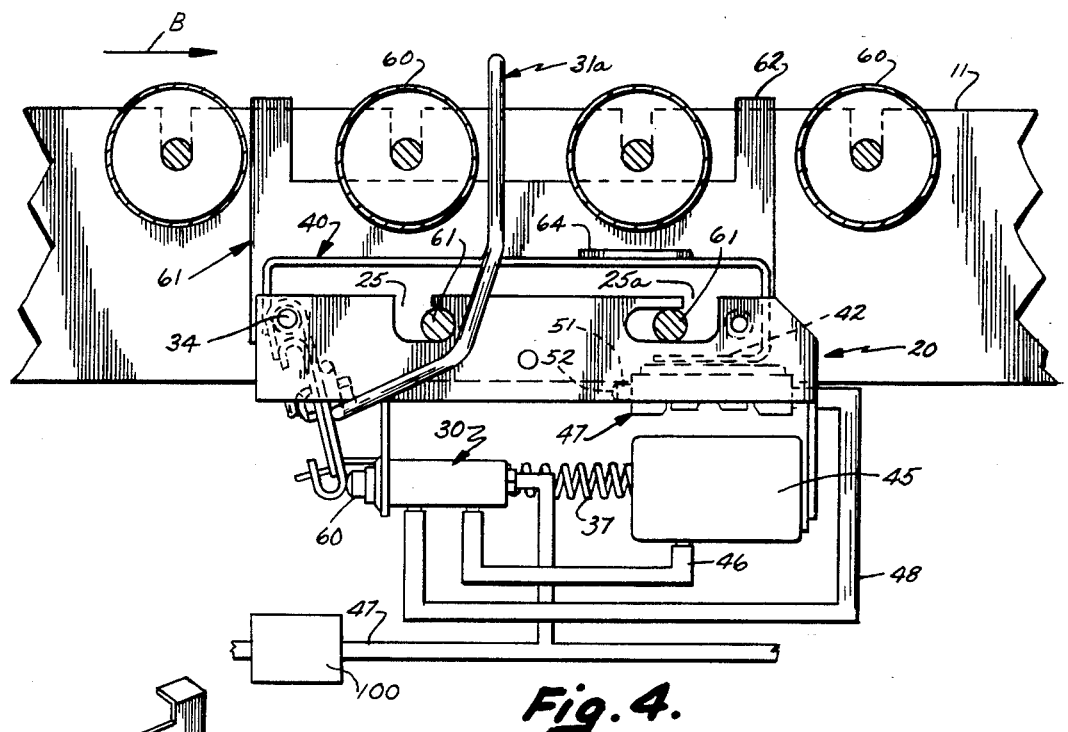
FIG. 4 is a view similar to FIG. 2 illustrating a modified form of the invention.

The numeral 10 identifies a typical gravity conveyor having side rails 11 interconnected at spaced intervals by cross members 12. The conveyor is equipped with axles 13 mounted to the rails for rotatably supporting the conveyor wheels 14 forming the transport surface. Such an arrangement is conventional construction for a gravity wheel conveyor.

The braking mechanism of this invention consists of independent units mounted in the conveyor at spaced intervals along the length of the conveyor. Each of the braking units 20 includes an elongated U-shaped frame 21. The frame has a pair of upwardly extending sides 22 connected by a bottom web 23. One end of the bottom web is sheared from the sides and folded downwardly to form a depending flange 24. Another flange 28 depends from the opposite end of the bottom web. Each of the sides have a pair of L-shaped slots 25 and 25a. Each slot has a vertically extending portion which opens through the top of the side and a horizontal portion extending parallel to the bottom of the frame. The horizontal leg portions of the slots 25 and 25a extend in opposite direction from the vertical portions of the slots. Further, the horizontal portion of the slot 25a is longer than the horizontal portion of the slot 25. By this means the frame can be supported on the existing axles 13 for the wheels 14 by first passing the slot 25a over one of the axles 13 and then shifting the unit to the right as it is illustrated in FIG. 2 until it can be passed around the second axle. The unit can then be shifted to the left as illustrated in FIG. 2 until one of the axles is seated against the end of the horizontal portion of slot 25. This locks the braking unit frame to the conveyor. The forces of articles approaching from the right as illustrated in FIG. 2 will tend to try to shift the unit to the left with the engagement between the shaft and the blind end of the slot 25 preventing the unit from disengaging the shafts.

Figure 6:
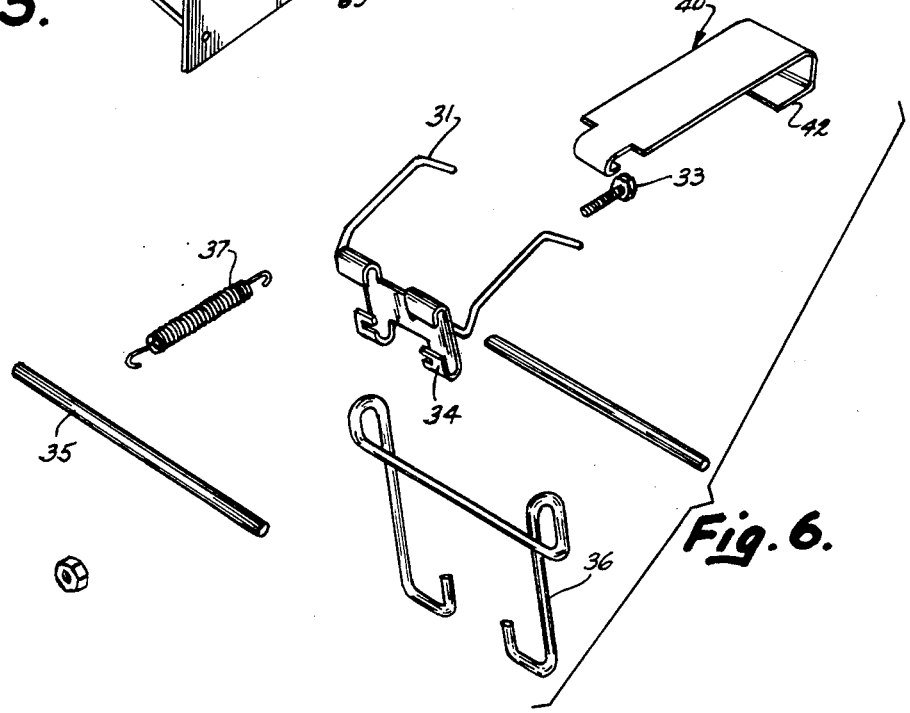
FIG. 6 is an exploded view of the sensor and valve actuator assembly.

Mounted on the depending flange 24 is a valve 30. The operation of the valve is controlled by a sensor having an arm 31, the upper portion of which extends up above the surface of the conveyor into the path of articles moving along the conveyor. The sensor arm is secured to the pivot plate 32 by bolt 33 (FIGS. 2 and 6). The pivot plate 32 is pivotally supported on pin 34. The lower end of the pivot plate is bent upwardly to provide seat for the rod 35. A spring clip type anchor bracket 36 secures both the pin 34 and the rod 35 and prevents them from disengaging the pivot plate. The sensor arm 31 is biased into normally erected position by a spring 37 secured to the rod 35 at one end and the flange 28 at the other end.

Also pivotally mounted to the frame on the same pin 34 is a brake plate 40. The brake plate overlies the top of the braking unit and has a free end 41 opposite from the pin 34. The free end is substantially at the opposite end of the frame 21. The free end 41 has a downwardly depending leg having a foot piece 42 which is reversely bent to parallel the top surface of the plate. The footpiece extends beneath the axle 13 supporting the frame and thereby acts as a stop limiting upward movement of the plate 40. The footpiece or shoe 42 rests on the pneumatically expandable actuator 44. The actuator 44 is fastened to the bottom web 23 of the frame, preferably midway between the sides of the frame. Suspended below the frame and mounted to the depending flange 28 at the end of the frame opposite from the flange 24 is a pneumatic accumulator 45. The accumulator is connected to the valve 30 by the conduit 46.

The valve 30 is connected to a source of air under pressure by the conduit 47 and is connected to the actuator 44 by the conduit 48.

The valve 30 has a central spool 50 spring biased to shift from the retracted position illustrated in FIG. 2 to an extended position when the sensor 31 is shifted away from it. In the retracted position, the valve 30 connects the compressed air supply 47 to the accumulator 45. At the same time it closes the line 48 leading from the valve to the actuator 44. When the valve spool 50 is released and shifts to its extended position, the accumulator is isolated from the compressed air supply 47 and is connected through the lines 46 and 48 to the actuator 44. This causes the actuator to expand, lifting the end 41 of the brake shoe 40 into frictional engagement with either the article or the roller overlying the brake unit and depressing the sensor 31.

The actuator 44 has a bleed 51 which is always open. Since the valve 30, when actuated, has isolated the accumulator 45 from its source of compressed air, the only air for operating the actuator is that which was contained in the accumulator. When this supply of air has been bled off by the bleed valve 51, the actuator will retract causing the brake shoe 40 to retract by its own weight and disengage the article. Thus, the article, its forward velocity reduced or completely stopped, is released to resume forward motion. The rate at which the air escapes through the bleed valve 51 can be adjusted by means of the screw 52 which can be made to increase or decrease the rate of escape of the air from the actuator. Thus, the brake, once the charge of air delivered to it from the accumulator has been exhausted, will remain inoperative indefinitely so long as the sensor 31 remains depressed. As soon as the sensor is released by the article and shifts to the raised position illustrated in FIG. 2, the actuator will once more be isolated from the accumulator and the accumulator will be recharged by the compressed air source ready for the next actuation. It will be observed that the embodiment of the invention illustrated in FIGS. 1-3 will operate irrespective of the direction of movement of the articles.

Figure 5:
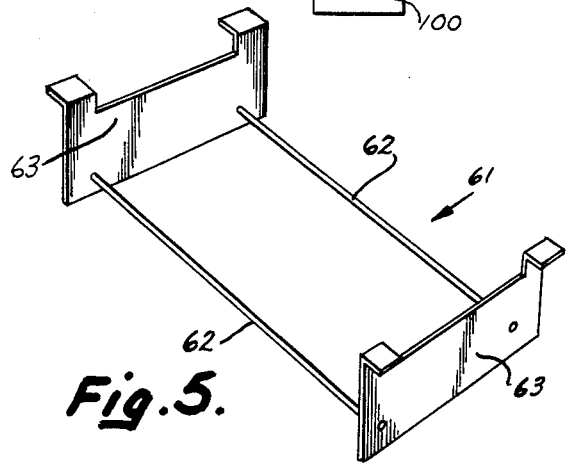
FIG. 5 is an oblique view of the support cradle utilized in FIG. 4.

The invention as illustrated in FIGS. 4 and 5 is very similar to the invention illustrated in FIGS. 1-3. It illustrates a modification of the invention adapting it for use on roller conveyors. In this case the unit is mounted beneath the conveyor rollers 60 forming the transport surface of the conveyor by suspension from a pair of rods 62 of a cradle or frame 61 which extend between the end brackets 63 designed to be hung on the side rails 11 of the conveyor. The frame can be installed simply by removing a pair of the rollers 60 which are reinstalled after the frame is seated. This is a relatively simple procedure since the axles of the roller are seated in vertical slots in the frame. In this case the brake lever 40 has a high friction pad 64 for engaging one of the rollers to provide the necessary braking action. The sensor 31a is reshaped to project above the surface of the rollers 60 whereby it will be depressed by an article moving in the direction of the arrow B (FIG. 4). The lower end of the sensor arm 31a is rigidly secured to the bracket 32 whereby pivotal movement of the arm 31a to the right, as illustrated in FIG. 4, will cause the bracket to move away from the spring loaded spool 50 of the valve 30 permitting the valve to shift from accumulator charge to actuator activation in exactly the same way as the valve, actuator and accumulator operate in the case of the invention as illustrated in FIG. 2.

While the embodiment illustrated in FIGS. 4-6 will only operate with articles moving in the direction of the arrow B (FIG. 4), it will be recognized that by redesigning the sensor and its mount, but without changing its function, this embodiment could also be made capable of operation with articles moving in either direction.

The amount of braking force required for proper operation depends on several factors, including the weight and size of the articles being moved along the conveyor, the pitch of the conveyor, the condition of the surface contacting the conveyor transport surface and the force necessary to rotate the various rollers or wheels of the conveyor. Thus, the greater the rate of acceleration of the articles and the momentum the articles acquire by reason of their velocity and their weight will determine the amount of braking force which must be applied to control the forward motion of the article. This can be done in two ways. One of these ways is to provide a pressure control valve 100 in the compressed air supply line 47 to provide air at the most effective pressure for producing the force necessary to effect adequate frictional retardation against the article. Preferably, this is an adjustable valve so that it can be manipulated to adapt the conveyor to the size and type of article to be transported. Another possibility is that of making the bleed 51 for each of the actuators variable so that the period the actuator maintains an effective braking force can be increased or decreased, depending on the amount of braking action needed. It is possible to utilize both means simultaneously with the adjustable valve 100 controlling the overall action of the brakes collectively and adjustment of the valve, in effect, "fine tuning" the individual braking mechanisms to assure efficient operation.

Since this invention provides a braking mechanism which automatically releases after a predetermined interval, it can be set to effectively brake articles having substantial momentum by reason of their size, weight or the ease with which they move along the conveyor surface. At the same time, articles having much less momentum can be handled with adjustment of the pressure valve 100 or the bleed valve 51 because the automatic release feature assures the articles' ability to resume forward motion even though the braking force applied would have been adequate to effectively slow the movement of the heavier articles. Also because the brake lever is pushed upwardly into the path of the articles, the heavier articles press against it with greater force thus generating greater frictional resistance than is the case with the lighter articles.

By making the unit a self contained and compact assembly, in other words a packaged unit, the units can be added to existing conveyors with a minimum of labor and down time interruption. Also this permits the number of units installed to be governed solely by the requirements of the particular conveyor system. Thus, the use of a packaged unit permits each installation to be customized. Once the units are hung in place, the only other installation work required is connecting them to a source of compressed air.

Having described a preferred construction of the invention together with a modification thereof it will be recognized that other modifications of the invention can be made without departing from the principles of the invention. Such modifications are to be considered as included in the hereinafter appended claims unless these claims by their language expressly state otherwise.

We claim:

1. A pneumatic retarder for gravity conveyor, said retarder having a frame, an article engaging brake plate having a free end and pivotally mounted at its other end to the frame; a pneumatically operated actuator mounted on said frame beneath said free end of the brake plate for lifting said free end of said plate; an accumulator for air under pressure; a valve connected to said accumulator and said actuator and to a source of air under pressure; said valve normally connecting said accumulator to the source of air under pressure and isolating said actuator from said accumulator; an article sensor connected to said valve for shifting said valve when tripped by an article to isolate said accumulator from the source of pressurized air and to connect said accumulator to said actuator; said actuator having a constantly open bleed orifice for releasing air therefrom for deactivating said actuator at a predetermined rate by releasing the charge of pressurized air received from the accumulator.

2. A pneumatic retarder as described in claim 1 wherein means are provided for supporting said retarder on a conveyor with said brake plate, when the actuator is retracted, in article disengaged position.

3. A pneumatic retarder as described in claim 2 wherein said conveyor is equipped with a plurality of parallel axles; said means being openings in said frame for engaging over and detachably supporting said retarder on a pair of adjacent axles.

4. A pneumatic retarder for gravity conveyor having a plurality of rotatable article support elements, said retarder comprising: an article engaging brake element; a pneumatically actuated member for moving the brake element into article engagement and brake force applying position when the member is activated; means for sensing the presence of an article over the brake element; a source of air; means for accumulating a predetermined volume of air under pressure from said source of air; a valve connected to and activated by said sensing means when the latter is contacted by an article for connecting said accumulating means to said actuator for admitting a charge of air of a predetermined volume to the actuator and simultaneously isolating said accumulator means from said source of air; said actuator having a constantly open bleed valve for discharging the charge of air from the actuator at a predetermined rate to deactivate the actuator and return the brake element to inactive position.

5. A pneumatic retarder for gravity conveyor as described in claim 4 wherein said valve has means for alternatively connecting said accumulator to said actuator and to a source of pressurized air.

6. A pneumatic retarder for gravity conveyor as described in claim 5 wherein said retarder has a frame; means for detachably securing said frame to a conveyor.

7. A pneumatic retarder for gravity conveyor as described in claim 6 wherein the rotatable article support means are conveyor wheels forming a conveying surface, said wheels being mounted on axles extending transversely of the conveyor; said means being hook elements on said frame for interengaging with at least a pair of said axles.

8. A pneumatic retarder for gravity conveyor as described in claim 6 wherein the conveyor has a plurality of rollers forming a conveying surface, a cradle suspended between the sides of the conveyor, said cradle having rods extending transversely of the conveyor; said means being hook elements on said frame for interengaging with said rods for supporting said retarder below said rollers.

9. A pneumatic retarder for gravity conveyor having a frame, a movable brake element, a pneumatic actuator for moving said brake element and means for sensing the presence of an article on the conveyor adjacent said brake element, said retarder characterized in that a pneumatic accumulator and a valve are mounted on said frame and engaged by said sensor, means connecting said valve to a source of compressed air and to said accumulator and said actuator; said valve normally connecting said accumulator to said air source and isolating said actuator from said accumulator, said valve when said sensor is engaged by an article shifting to isolate the accumulator from said air source and connect it to said actuator to shift the brake element into article braking position; an air bleed on said actuator for bleeding from the actuator at a predetermined rate the charge of air received from the accumulator to deactivate the brake element.

10. The pneumatic retarder described in claim 9 further characterized in that an adjustable pressure valve is mounted between said accumulator and the source of air.

11. The pneumatic retarder described in claim 10 further characterized in that said air bleed has means for adjusting its rate of discharge.

* * * * *